United States Patent
Cepuran

(10) Patent No.: US 9,886,283 B2
(45) Date of Patent: Feb. 6, 2018

(54) ADAPTIVE BOOT SEQUENCE FOR VEHICLE INFOTAINMENT SYSTEM

(71) Applicant: GM Global Technology Operations LLC, Detroit, MI (US)

(72) Inventor: Lawrence D. Cepuran, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 121 days.

(21) Appl. No.: 14/702,442

(22) Filed: May 1, 2015

(65) Prior Publication Data

US 2016/0321080 A1    Nov. 3, 2016

(51) Int. Cl.
     *G06F 9/44*      (2006.01)
     *G01C 21/26*      (2006.01)
     *G01S 19/39*      (2010.01)
     *B60K 35/00*      (2006.01)

(52) U.S. Cl.
CPC ............ *G06F 9/4401* (2013.01); *B60K 35/00* (2013.01); *G01C 21/26* (2013.01); *G01S 19/39* (2013.01); *B60K 2350/35* (2013.01)

(58) Field of Classification Search
CPC ....... G06F 9/4401; G01C 21/26; G01S 19/39; B60K 35/00
See application file for complete search history.

(56) References Cited

U.S. PATENT DOCUMENTS

| | | | | |
|---|---|---|---|---|
| 2007/0162785 A1* | 7/2007 | Downer | ............ | G06F 11/1402 714/15 |
| 2007/0206211 A1* | 9/2007 | Okutsu | .................. | G03G 15/50 358/1.14 |
| 2009/0193246 A1* | 7/2009 | Emori | .................... | G06F 3/0611 713/100 |
| 2010/0332363 A1* | 12/2010 | Duddle | .................. | B67D 7/348 705/34 |
| 2013/0054945 A1* | 2/2013 | Free | ...................... | G06F 1/3203 713/2 |
| 2015/0212825 A1* | 7/2015 | Kim | ...................... | G06F 9/4401 713/2 |

* cited by examiner

*Primary Examiner* — Thomas Lee
*Assistant Examiner* — Vincent Chang
(74) *Attorney, Agent, or Firm* — Christopher DeVries; Reising Ethington P.C.

(57) ABSTRACT

A mobile communication system and a method of providing content data to user of a vehicle using the communication system. The method includes: determining at a vehicle a last-used content data function associated with a previous ignition cycle, wherein the last-used content data function was used to provide content data to vehicle users; determining an adaptive boot sequence that includes the last-used content data function; executing the adaptive boot sequence at a subsequent ignition cycle which includes initiating the last-used content data function; and providing content data in the vehicle via the last-used content data function.

16 Claims, 2 Drawing Sheets

ADAPTIVE BOOT SEQUENCE FOR VEHICLE INFOTAINMENT SYSTEM

TECHNICAL FIELD

The present invention relates to providing content functions via an infotainment system in a vehicle.

BACKGROUND

Modern vehicle head units provide a variety of functionalities which require sufficient time to load at vehicle start-up. With this increased functionality, the time to load these various functions may negatively impact the user experience by significantly delaying the provision of head unit functions such as the resumption of music or other audio. Thus, there is a need to improve the user experience by enabling content functions to the user more expeditiously.

SUMMARY

According to an embodiment of the invention, there is provided a method of providing content data to users of a vehicle. The method includes: determining at a vehicle a last-used content data function associated with a previous ignition cycle, wherein the last-used content data function was used to provide content data to vehicle users; determining an adaptive boot sequence that includes the last-used content data function; executing the adaptive boot sequence at a subsequent ignition cycle which includes initiating the last-used content data function; and providing content data in the vehicle via the last-used content data function.

According to another embodiment of the invention, there is provided a method of providing content data to users of a vehicle. The method includes: providing content data in the vehicle via a vehicle infotainment system (VIS); determining a vehicle power OFF condition; in response to determining the vehicle power OFF condition, determining a first content data function of the VIS that is being currently used; using the first content data function, determining an adaptive boot sequence for a subsequent ignition cycle, wherein the first content data function is given priority in the adaptive boot sequence; determining a vehicle power ON condition; and based on determining the vehicle power ON condition, providing content data via the VIS using the adaptive boot sequence.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method described below employs an adaptive boot sequence associated with an infotainment system in a vehicle. The infotainment system may provide a wide variety of content data to a vehicle user, according to one or more content data functions (e.g. such as an AM/FM radio, a satellite radio, a short range wireless communication link with another device, etc.). The adaptive boot sequence enables content data (which may be most desirably received by the user) to be received sooner, rather than making the user wait for a boot or loading of various content data functions. Thus, the user may begin to receive desired content data sooner using the mobile communication system and the method(s) described below.

Communications System

Figure 1:
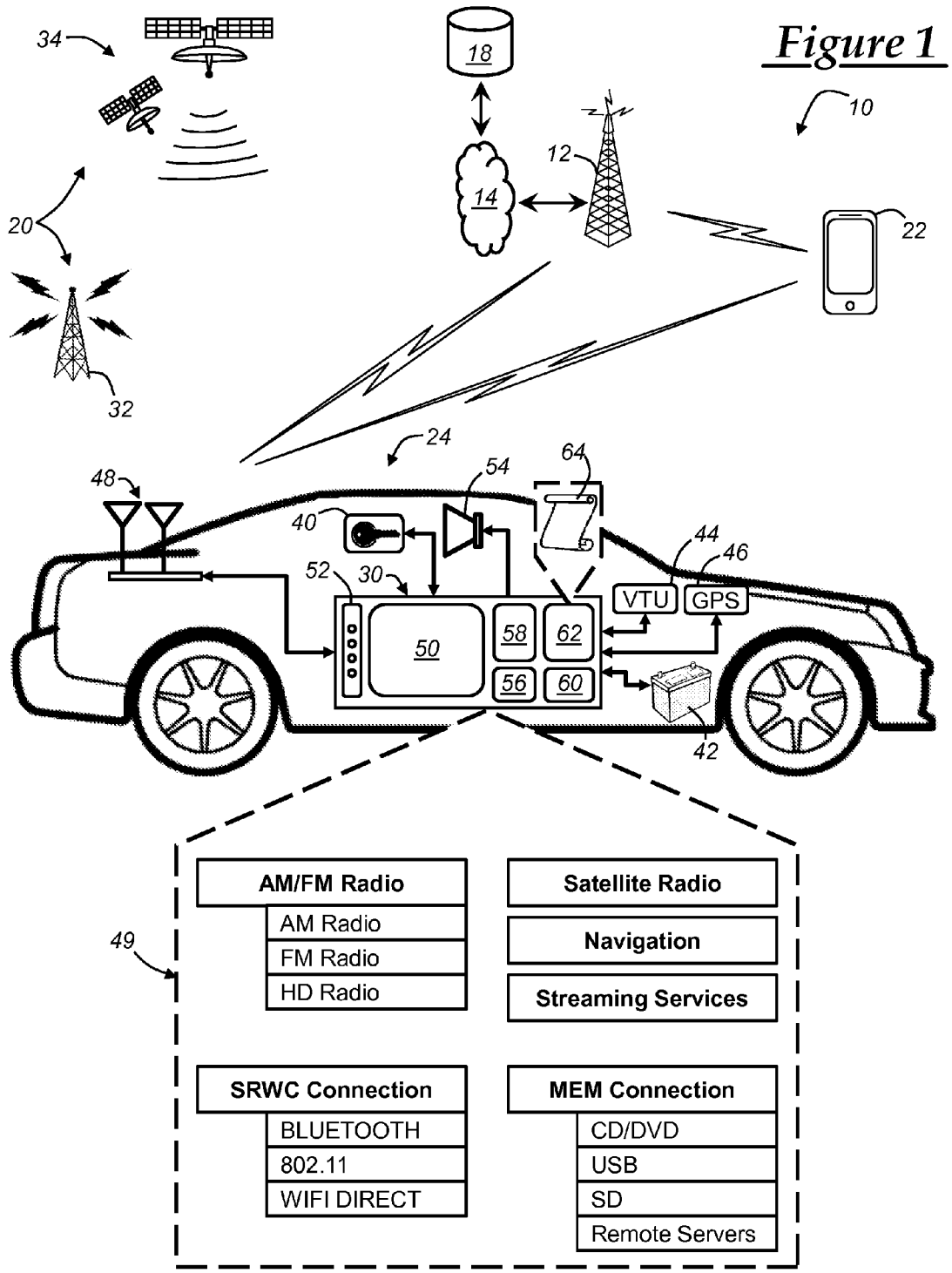
FIG. 1 is a block diagram depicting an embodiment of a mobile vehicle communications system that is capable of utilizing the method disclosed herein.

With reference to FIG. 1, there is shown an operating environment that comprises a mobile vehicle communications system 10 that can be used to implement the method disclosed herein. Communications system 10 generally includes: one or more wireless carrier systems 12; a land communications network 14; one or more remote servers 18; one or more broadcasting systems 20; one or more mobile devices 22; and a vehicle 24 equipped with a vehicle infotainment system (VIS) 30. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 12 is preferably a cellular telephone system that includes a plurality of cell towers (only is one shown), one or more mobile switching centers (MSCs) or the like, as well as any other networking components required to connect wireless carrier system 12 with land network 14. Each cell tower includes sending and receiving antennas and a base station, with the base stations from different cell towers being connected to the MSC either directly or via intermediary equipment such as a base station controller. Cellular system 12 can implement any suitable communications technology, including for example, analog technologies such as AMPS, or the newer digital technologies such as CDMA (e.g., CDMA2000), GSM/GPRS, or LTE. As will be appreciated by those skilled in the art, various cell tower/base station/MSC arrangements are possible and could be used with wireless system 12. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Land network 14 may be a conventional land-based telecommunications network that is connected to one or more landline telephones and connects wireless carrier system 12 to the remotely located server(s) 18 (e.g., computers). For example, land network 14 may include a public switched telephone network (PSTN) such as that used to provide hardwired telephony, packet-switched data communications, and the Internet infrastructure. One or more segments of land network 14 could be implemented through the use of a standard wired network, a fiber or other optical network, a cable network, power lines, other wireless networks such as wireless local area networks (WLANs), or networks providing broadband wireless access (BWA), or any combination thereof.

Remote server(s) 18 can be one of a number of computers accessible via a private or public network such as the internet. Each such server 18 is capable of providing content data and can be used for one or more purposes, such as a web server accessible via land network 14 and/or wireless carrier 12. Other such accessible servers 18 can be, for example, a client computer or a third party repository or application service provider. Client computers may be used by the vehicle owner for such purposes as accessing or receiving vehicle-related content data (e.g., setting up or configuring subscriber preferences or controlling vehicle functions). A third party repository may communicate with vehicle 24 by receiving or transmitting vehicle-related content data or other information. Application service providers (ASPs) can provide other types of content data—e.g., providing streaming or other media (e.g., audio and/or video). The media may be stored in databases or be relayed from other locations. ASPs are also suitable for providing live television or cable-related subject matter.

Broadcasting devices 20 may include radio and satellite communication devices; e.g., an illustrative AM and/or FM radio tower 32 is shown as well as multiple satellites 34 for communication with, e.g., vehicle 24. Tower 32 and satellites 34 are merely examples of broadcasting devices 20 which may be used to provide uni-directional and/or bi-directional communication with vehicle 24. Uni-directional communication can be, for example, satellite radio services, wherein programming content data (news, music, etc.) is received by transmitting station, packaged for upload, and then sent to the satellite 34, which broadcasts the programming to subscribers at vehicle 24. Bi-directional communication can be, for example, satellite telephony services using satellite 34 to relay telephone communications between the vehicle 24 and an uplink transmitting station (not shown).

Mobile device 22 may be any electronic device capable of cellular voice and/or data calls across a wide geographic area where transmissions are facilitated by the wireless carrier system 12 or other wireless systems (e.g., including, but not limited to using short range wireless communication links). Device 22 may be configured to provide cellular services according to a subscription agreement with a third-party facility such as a wireless service provider (WSP). In addition, mobile device 22 may be electronically coupled to the vehicle 24 by wire (e.g., USB) or wirelessly via short-range wireless communication (SRWC) (e.g., 802.11 protocol(s), Wi-Fi Direct, Bluetooth, WiMax, etc.). Non-limiting examples of the mobile device 22 include a cellular telephone, a personal digital assistant (PDA), a Smart phone, a personal laptop computer or tablet computer having two-way communication capabilities, a netbook computer, a notebook computer, or any suitable combinations thereof. The mobile device 22 may be used inside or outside of vehicle 24 by the vehicle user who may be a vehicle driver or passenger. It should be appreciated that the user does not need to have ownership of the mobile device 22 or the vehicle 24 (e.g., the vehicle user may be an owner or a licensee of either or both).

Vehicle 24 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 24 includes an ignition module 40, a power source 42, a vehicle telematics unit (VTU) 44, a global positioning system (GPS) module 46, the vehicle infotainment unit (VIS) 30, and one or more antennas 48 coupled to the VIS 30 and/or telematics unit 44. Vehicle 24 may include other electronic elements that are not shown including one or more microphones, pushbuttons or control inputs, visual display(s), and various other system or control modules (VSMs) for controlling or regulating various vehicle subsystems.

Ignition module 40 may be any suitable electronic system or circuitry for starting vehicle 24. Module 40 may be adapted for use with a vehicle key or a starting switch (e.g., for push-button start ignition). The module may be coupled to the vehicle engine (not shown) which may be a combustion engine, electric engine, hybrid engine, or the like, and module 40 may serve to actuate an ignition sequence or command for vehicle 24. Other implementations of ignition module 40 may be adapted to remotely start vehicle 24, including but not limited to operations using a wireless key fob and/or a software application executable on a remote computer 18 or mobile device 22. Software applications may utilize a remote data service center according to a user subscriber agreement, and may or may not involve the services of a live advisor. Ignition module 40 is shown coupled to VIS 30; however, it may be coupled to other devices and/or systems within vehicle 24 as well (e.g., to power source 42, telematics unit 44, etc.).

Power source 42 may include any conventional electrical power devices such as a battery, an alternator, wiring harnesses, etc. Source 42 may be coupled to VIS 30 and other devices (e.g., ignition module 40, telematics unit 44, GPS module 46, etc.); e.g., providing electrical power to such devices when vehicle 24 is powered down.

Vehicle telematics unit (VTU) 44 may be any suitable device installed in vehicle 24 enabling wireless voice and/or data communication (e.g., via wireless carrier system 12). In some implementations, telematics unit 44 may utilize SRWC as well (e.g., Wi-Fi, Wi-Fi Direct, Bluetooth, etc.) and facilitate receiving or sending content data to users of the vehicle. In some implementations, telematics unit 44 may act as a wireless hotspot server and provide hotspot services to VIS 30 and/or mobile device(s) 22 (which act as client devices). In other implementations, telematics unit 44 may be a member of an ad-hoc or mesh network and thereby provide content data to other members (e.g., VIS 30). Telematics unit 44 also may be coupled to VIS 30 via a wired implementation (e.g., Ethernet or the like—using any suitable protocol over a local area network); it may further be coupled to at least one of the antennas 48 for the sending and/or receiving of content data. The capability of telematics unit 44 should be construed broadly; similarly, telematics unit 44 may be capable of carrying out a variety of other vehicle services as disclosed in U.S. Application Publication 2014/0200740, the entirety of which is incorporated by reference herein.

GPS module 46 may receive radio signals from one or more GPS satellites and using these signals, may determine vehicle position. This determination may be used, at least in part, to provide navigation and other position-related services to a vehicle user (e.g., the driver). In at least one embodiment, content data received via the GPS module 46 is provided to the VIS 30 and displayed to the user as navigation or map data.

Vehicle infotainment system (VIS) or head unit 30 may be any suitable electronic device for providing content data 49 to the user(s) of vehicle 24. In at least one implementation, VIS 30 includes a display 50, a user interface 52, one or more audio speakers 54, and one or more communication circuits 56 (e.g., for reception of AM signals, FM signals, satellite signals, for short-range wireless communication (SRWC) with mobile device 22 and/or telematics unit 44, and/or even wired reception (e.g., an Ethernet transceiver for communication with devices such as telematics unit 44)). VIS 30 further may include one or more auxiliary inputs 58 (e.g., for external memory devices), one or more processors 60, and memory 62. VIS 30 may be embedded in vehicle 24;

e.g., in some implementations, the VIS may be in the center stack module of the vehicle's instrument panel. Content data 49 provided by VIS 30 should be broadly construed to include radio content data (e.g., AM radio, FM radio, high-definition or HD radio, satellite radio, etc.), any content data received by the VIS 30 via a SRWC link (e.g., from mobile device 22 or telematics unit 44), any navigation content data (e.g., including mapping or directional data using GPS module), and any stored content data on external memory or storage devices (e.g., compact disks (CDs), digital versatile disks (DVDs), universal serial bus (USB) memory and other flash-type memory, secure digital (SD) memory cards, and external servers such as server 18, just to name a few examples). Thus, content data 49 includes audio, visual, and audio-visual data and may or may not be streamed to vehicle 24. Thus, content data may be received first by other devices (e.g., VTU 44 or mobile device 22), and then provided to VIS 30—ultimately to be received by the vehicle user. Or content data may be provided directly to VIS 30 (e.g., via one of the antennas 48, external memory devices, etc.) and then received by the user.

Display 50 includes any suitable electronics device for providing visual content data to the user. It may be a graphical display that may or may not have touch screen capability. User-interface 52 may include the touch screen capability (e.g., in the instances a touch screen display is implemented) and further may comprise one or more switches and/or pushbuttons for user control of VIS 30. User-interface 52 should be construed broadly enough to include automatic speech recognition and/or voice-control for hands-free operation (e.g., VIS 30 could include a microphone and speech processing unit). Speaker(s) 54 are configured to provide audio content data to the user(s), as will be appreciated by skilled artisans. In addition, display 50, user-interface 52, and speaker(s) 54 may be coupled to other components of VIS 30 including the one or more processors 60 and memory 62.

Communication circuits 56 include any suitable transceiver chipsets and/or circuitry for wireless communication. For example, in one embodiment, transceiver 56 comprises a short-range wireless communication (SRWC) chipset coupled to, among other things, processor 60. Non-limiting examples of SRWC include: various Wi-Fi standards (e.g., IEEE 802.11); Wi-Fi Direct, Bluetooth, Digital Living Network Alliance (DLNA), WiMAX, and ZigBee™. Transceiver 56 may include chipsets for one or more of these protocols, or may have multi-function chipsets. In some implementations, transceiver 56 may be a cellular chipset, or VIS 30 may utilize telematics unit 44 for cellular communications (e.g., being coupled thereto). In another embodiment, communication circuit 56 may be any chipset, oscillator, etc. for radio and/or satellite reception and/or communication. And in some embodiments, circuits 56 may include multiple chipsets, oscillators, and the like. Regardless of the implementation, communication circuits 56 may enable communication of content data between VIS 30 and the mobile device(s) 22, telematics unit 44, or the like.

Auxiliary inputs 58 may include any suitable jack or port, receptacle, deck, or other receiver for receiving an external memory device—including but not limited to CDs, DVDs, USB connectors, or SD cards. Via such inputs, the user may receive, e.g., audio and/or visual content data via display 50, speaker(s) 54, and/or any other display/audio system in vehicle 24. Other implementations of auxiliary inputs 58 will be appreciated by those skilled in the art.

Processor(s) 60 may be any type of device capable of processing electronic instructions including microprocessors, microcontrollers, host processors, controllers, vehicle communication processors, and application specific integrated circuits (ASICs). It can be a dedicated processor used only for VIS 30 or can be shared with other vehicle systems (e.g., telematics unit 44). Processor 60 may execute various types of digitally-stored instructions, such as software or firmware programs 64 stored in memory 62, which enable VIS 30 to provide content data 49 to the vehicle user(s). For instance, processor 60 may execute one or more programs and/or process data to carry out at least a part of the method discussed herein.

Memory 62 may include any suitable computer usable or readable medium, which may include one or more storage devices or articles. In at least one implementation, at least a portion of memory 62 may be comprised within processor 60 (e.g., in a microprocessor). Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes.

Method

Figure 2:
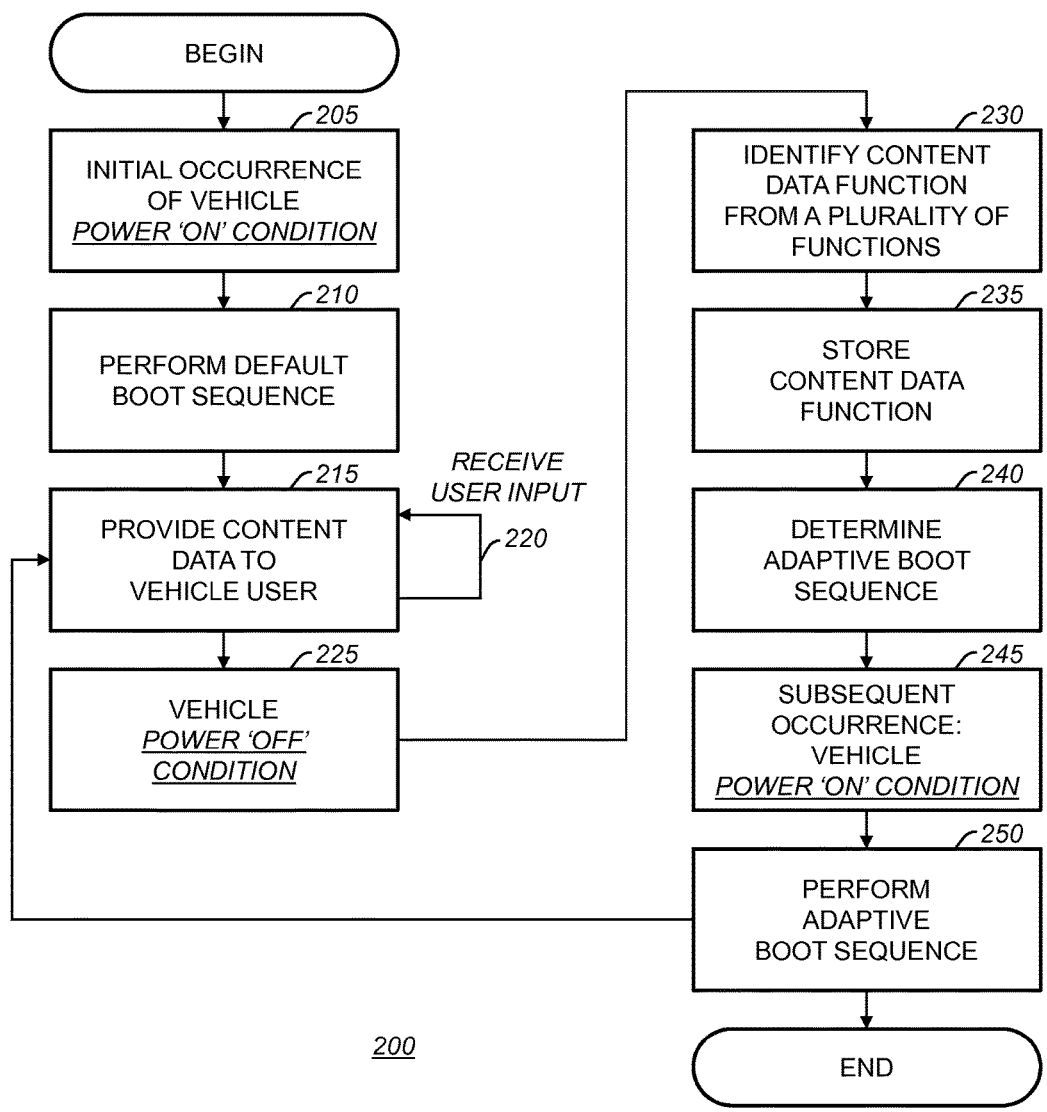
FIG. 2 is a flow diagram illustrating one method of using the communications system of FIG. 1.

Turning now to FIG. 2, there is shown a method 200 of performing an adaptive boot sequence of the VIS 30 when the vehicle is powered ON. The adaptive boot sequence enables one function of the VIS 30 to be initiated or loaded prior to other functions at vehicle start-up. In some implementations, this is the last-used function prior to the vehicle being powered OFF or down in a previous ignition cycle. In at least one implementation, the method 200 occurs at the VIS 30—e.g., using software instructions stored in memory 62 and executed by processor(s) 60. Of course, this is merely an exemplary implementation; other hardware devices in vehicle 24 may perform all or a portion of the steps of method 200 instead (e.g., such as VTU 44).

Method 200 begins with step 205 where an initial occurrence of a vehicle power ON condition is determined or detected. This detection may occur at a factory or occur first by any user of vehicle 24 following its manufacture. In addition, step 205 may occur in a variety of ways. For example, the power ON condition may be detected at the ignition module 40, via VIS 30 (e.g., when a power-up signal is received, e.g., from an engine control module or the like in vehicle 24), or via any other vehicle device when the vehicle engine is initiated. When the ignition module 40 or other vehicle device detects the power ON condition, it may communicate this to VIS 30 via a communication signal. Regardless of whether VIS 30 detects this start-up or another device detects this start-up, VIS 30 determines this occurrence in step 205. Thereafter, method 200 proceeds to step 210.

In step 210, a default boot sequence may be performed by VIS 30. This default boot sequence may include loading each of the various VIS 30 functionalities which enable content data 49 to be provided to the vehicle users. For example, one content data function is a satellite radio function (e.g. for providing content data using the satellite of VIS 30). Additional non-limiting examples of content data 49 functions include: an AM radio function, an FM radio function, an auxiliary input function, an application service provider (ASP) receiving function (e.g. via telematics unit 44), one or more SRWC transceiving functions, and a GPS receiving function. Some of these content data functions may provide streaming data (e.g., including audio and/or video); others may not. Thus, the default boot sequence may load these content data functions in a predetermined order (e.g., set by the manufacturer or by an authorized service person, such as at a vehicle service center or facility), and this order may occur each time the vehicle power ON condition is determined. In some implementations, none of the content data functions are available for use by the vehicle user until all of the content data functions are loaded. In other implementations, content data functions become available as they are loaded in the predetermined sequence. Following step 210, the method proceeds to step 215.

In step 215, content data 49 is provided to the vehicle user via VIS 30. As discussed above, content data should be construed broadly; this may include any suitable information provided via VIS 30 (e.g., via display 50 or speakers 54), or the VIS 30 may provide such suitable information to other displays or audio devices within vehicle 24. Step 220 may follow step 215.

In step 220, VIS 30 receives an indication of a user input associated with a content data function. This may be via user-interface 52 or by any other suitable manner. Thus, while the VIS 30 may be providing FM radio functionality, the user input may indicate a desire to change to a satellite radio functionality. Step 220 is not necessary, and in some implementations, may occur repeatedly following a powered ON condition of vehicle 24 (e.g., during the same ignition cycle). Following step 220 (or step 215 when step 220 is skipped), the method proceeds to step 225.

In step 225, VIS 30 determines a power OFF or power down condition. This determination, like in step 205, may occur at the engine control module, via the VIS 30, or in any other suitable manner. Step 230 follows.

In step 230, VIS 30 may determine or identify the last-used content data function from among the other content data functions. Thus, if at the time the power OFF condition is detected the VIS 30 is providing satellite radio functionality, the satellite radio content data function may be identified. Thus, in embodiments where step 220 was omitted (e.g., VIS 30 did not receive user input during the time when vehicle 24 was powered ON and then subsequently powered OFF), the last-used content data function may be the same as the content data function provided at start-up. Following step 230, method 200 proceeds to step 235.

In step 235, the last-used content data function is stored. In at least one embodiment, the identity of this last-used function is stored in memory 62 of VIS 30. Of course, this is merely an example; other embodiments also exist (e.g., storing the last-used function at processor 60 or in VTU 44). Then, method 200 proceeds to step 240.

In step 240, an adaptive boot sequence is determined. In one implementation, the adaptive boot sequence includes placing the last-used content data function as the first loaded content data function at a subsequent vehicle start-up (e.g., at the determination of a future power ON condition). Thus, the last-used used content data function is given greater priority (and in at least one embodiment, the greatest priority). In another embodiment, those content data functions which were most recently used (or most often used), are loaded next—i.e., following the last-used content data function. Thus, if the satellite radio function was used last at the time of step 225 (vehicle 24 powered OFF condition), then the adaptive boot sequence determines it to be the first-loaded at next vehicle start-up. In addition, the FM radio function could be second-loaded at next vehicle start-up (e.g., if it was used most often or even if it was used previous to the satellite radio function). Used 'most often' may mean over the course of numerous ignition cycles or during a single ignition cycle. In other embodiments, the last-used content data function (e.g., the satellite radio function) may be loaded first, and then the subsequently loaded content data functions may occur in any suitable order (e.g., according to the default boot sequence, of course, with the exception of the last-used data function). In yet another embodiment, two or more content data functions may be loaded simultaneously (e.g., the AM radio function and the FM radio function). These are all merely examples—other determined adaptive boot sequences will be apparent to skilled artisans. Following determining the adaptive boot sequence, the sequence may be saved in memory 62. Saving the adaptive boot sequence may or may not require the use of battery power (e.g., from source 42); e.g., in some implementations, a vehicle power budget may not necessitate use of battery power. Next, method 200 proceeds to step 245.

In step 245, a subsequent power ON condition occurs and is detected. This may be similar to the power ON condition determined in step 205; therefore, this detection will not be elaborated further here. Following step 245, method 200 proceeds to step 250.

In step 250, VIS 30 performs the adaptive boot sequence determined in step 240. Proceeding with the illustrative example above, VIS 30 loads the satellite radio function first (as it was the last-used content data function). Thereafter, VIS 30 loads the remaining content data functions in accordance with the determined adaptive boot sequence. In at least one implementation, the first-loaded content data function (e.g., satellite radio in this instance) may be made available immediately to the user; therefore, the user may not be required to wait for all or any other of the remaining VIS 30 functions to be loaded. In addition, it is presumed that by loading the previous content data function, user experience will be improved as the user will not need to wait as long for the user's desired functionality to become available. This is particularly true where infotainment systems continue to become more complex and have additional functions which were not historically available. Following step 250, method 200 may end, or in other instances, method 200 may loop back to step 215 (e.g., repeating steps 215-250 again), providing continuous user satisfaction.

Thus, it will be appreciated that a relatively long time may transpire while the VIS 30 loads the software applications associated with multiple content data functions. The VIS 30 does not require the user to wait until each of these software applications (e.g., each associated with a different content data function) are loaded. Thus, in at least some implementations, priority is provided to one or more content data functions in order to improve the user experience—thereby loading a determined software application and making at least one of these content data functions available for use, even before the remaining content data functions and their associated software applications are loaded.

Other embodiments also exist. For example, in one implementation, the adaptive boot sequence may be programmed or preconfigured by the user so that a first (or second, third, etc.) content data function is loaded each time vehicle 24 experiences a power ON condition.

In other embodiments, the adaptive boot sequence may be determined at a subsequent ignition cycle and thereafter executed. For example, instead of determining the adaptive boot sequence (e.g., and the priority of the last-used content data function) at the time of the vehicle power OFF condition, the adaptive boot sequence may be determined at the initiation of the subsequent ignition cycle. In another implementation, the adaptive boot cycle may be determined while the vehicle engine is off (i.e., following power down, but prior to a subsequent power ON condition).

Thus, there has been disclosed a vehicle infotainment system capable of prioritizing at least one of a plurality of content data functions. The system may load or boot a last-used content data function at the time of vehicle start-up thereby making the particular function ready-to-use by a vehicle user before the remaining functions are loaded. In addition, the remaining content data functions may be loaded in a desirable order or sequence. The last-used content data function may be available for use while the remaining content data functions load.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing content data to users of a vehicle, comprising the steps of:
    detecting a vehicle power OFF condition;
    in response to the detection of the vehicle power OFF condition, determining at a vehicle a last-used content data function being carried out at the time of the vehicle power OFF condition, wherein the last-used content data function was used to provide content data to vehicle users, wherein the vehicle includes two or more streaming content data functions, wherein the last-used content data function is one of the two or more streaming content data functions, and wherein the two or more streaming content data functions include two or more of the following: satellite radio function, AM radio function, FM radio function, auxiliary input function, global positioning system (GPS) receiving function, and short-range wireless communication (SRWC) function;
    determining, after the detection of the vehicle power OFF condition and before a subsequent vehicle power ON condition, an adaptive boot sequence that includes the last-used content data function, wherein the vehicle includes a default boot sequence that comprises loading the two or more streaming content data functions in a default order, and wherein the adaptive boot sequence comprises loading the last-used content data function prior to the remaining of the two or more streaming content data functions;
    executing the adaptive boot sequence in response to detecting a subsequent power ON condition, wherein the execution of the adaptive boot sequence includes initiating the last-used content data function; and
    providing content data in the vehicle via the last-used content data function.

2. The method of claim 1, wherein the providing content data via the last-used content data function occurs while the remaining of the plurality of streaming content data functions are loaded.

3. The method of claim 1, wherein a second content data function is given secondary priority and loaded following the loading of the last-used content data function, wherein the second content data function is one of the following: a most-often-used content data function or a most-recently-used content data function.

4. The method of claim 1, wherein content data includes at least one of the following: radio content data, short range wireless communication (SRWC) link content data, navigation content data, or external storage content data.

5. The method of claim 4, wherein radio content data includes content data received via one or more of the following: AM radio, FM radio, high-definition (HD) radio, or satellite radio.

6. The method of claim 4, wherein SRWC link content data includes content data received via a mobile device associated with the vehicle or a telematics unit associated with the vehicle.

7. The method of claim 4, wherein the navigation content data is received via a GPS module in the vehicle.

8. The method of claim 4, wherein the external storage content data is received via an auxiliary input in the vehicle or via a remotely-located server.

9. The method of claim 1, wherein a vehicle infotainment system (VIS) performs one or more of the following: determining the last-used content data function, determining the adaptive boot sequence, executing the adaptive boot sequence, and providing the content data.

10. The method of claim 1, wherein the adaptive boot sequence replaces a previous boot sequence.

11. The method of claim 10, wherein the previous boot sequence is one of a previous adaptive boot sequence or the default boot sequence.

12. The method of claim 11, wherein the default boot sequence is configured at a manufacturer or at an authorized service center.

13. A method of providing content data to users of a vehicle, comprising the steps of:
    providing content data in the vehicle via a vehicle infotainment system (VIS);
    determining a vehicle power OFF condition;
    in response to determining the vehicle power OFF condition, determining whether an audio/visual content data function of the VIS is being currently used, wherein the vehicle includes a plurality of audio/visual content data functions, and wherein each of the plurality of audio/visual content data functions include providing audio and/or visual content to a user of the vehicle;
    when it is determined that an audio/visual content data function of the VIS is being currently used, determining an adaptive boot sequence for a subsequent startup of the vehicle, which includes determining the audio/visual content data function that is currently being used, wherein the adaptive boot sequence includes loading the plurality of the content data functions in a different order than a default order, wherein the audio/visual content data function is given priority in the adaptive boot sequence with respect to other audio/visual content data functions that comprise the plurality of audio/visual content data functions;
    determining a vehicle power ON condition; and based on determining the vehicle power ON condition, providing content data via the VIS either using the adaptive boot sequence when it is determined that an audio/visual content data function of the VIS is being currently used or using a default boot sequence, wherein the default boot sequence includes loading the plurality of the content data functions in the default order;

wherein the determining of the adaptive boot sequence occurs after the detection of the vehicle power OFF condition and before the vehicle power ON condition.

14. The method of claim 13, wherein, following the determination of the power ON condition, providing content data in the vehicle first according to the audio/visual content data function.

15. The method of claim 14, wherein the at least some of the plurality of audio/visual content data functions are available via the VIS.

16. The method of claim 15, wherein the audio/visual content data function is loaded in the adaptive boot sequence and content data is provided thereby prior to all of the remaining of the plurality of audio/visual content data functions being loaded.

* * * * *